ABSTRACT OF THE DISCLOSURE

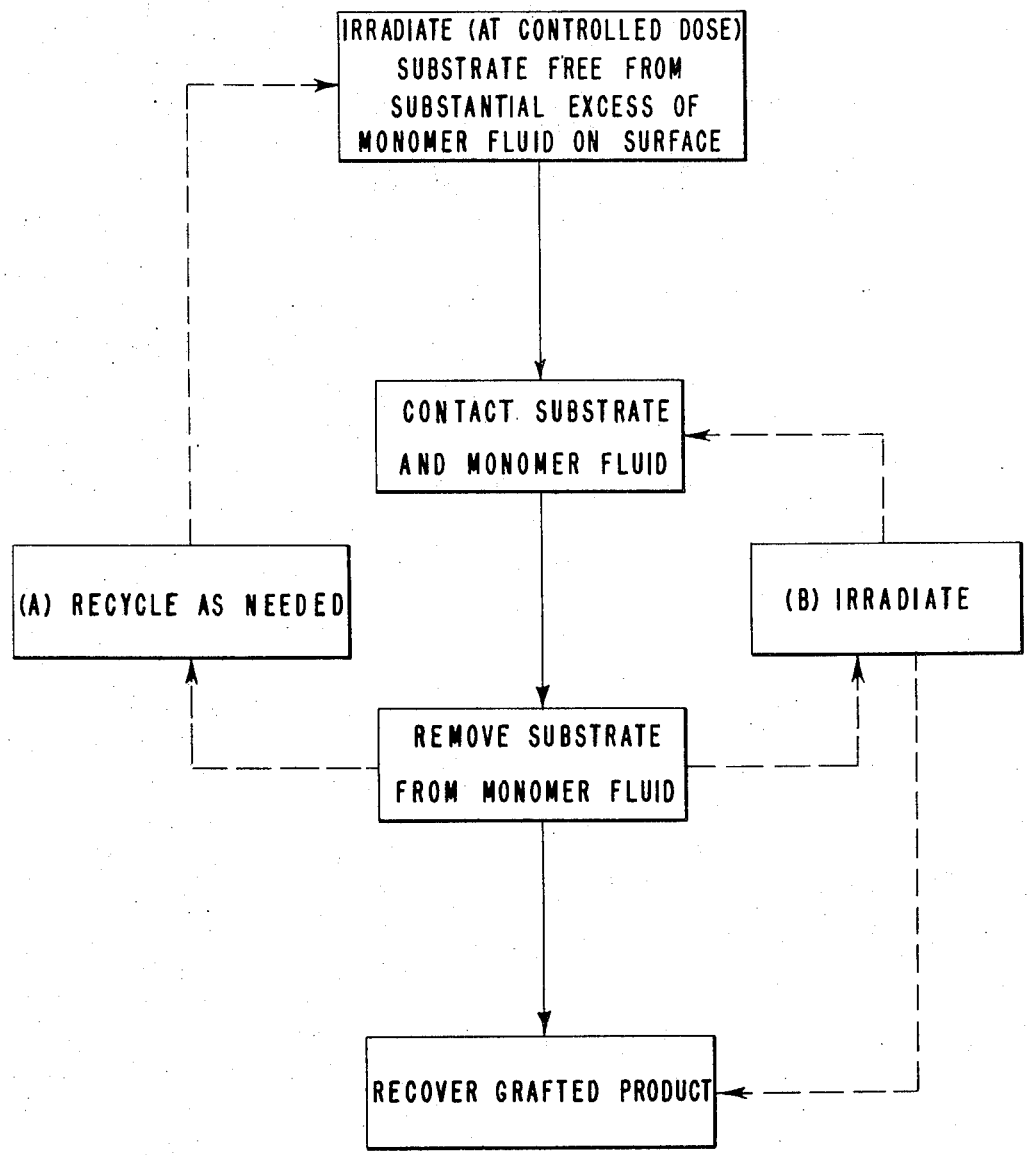

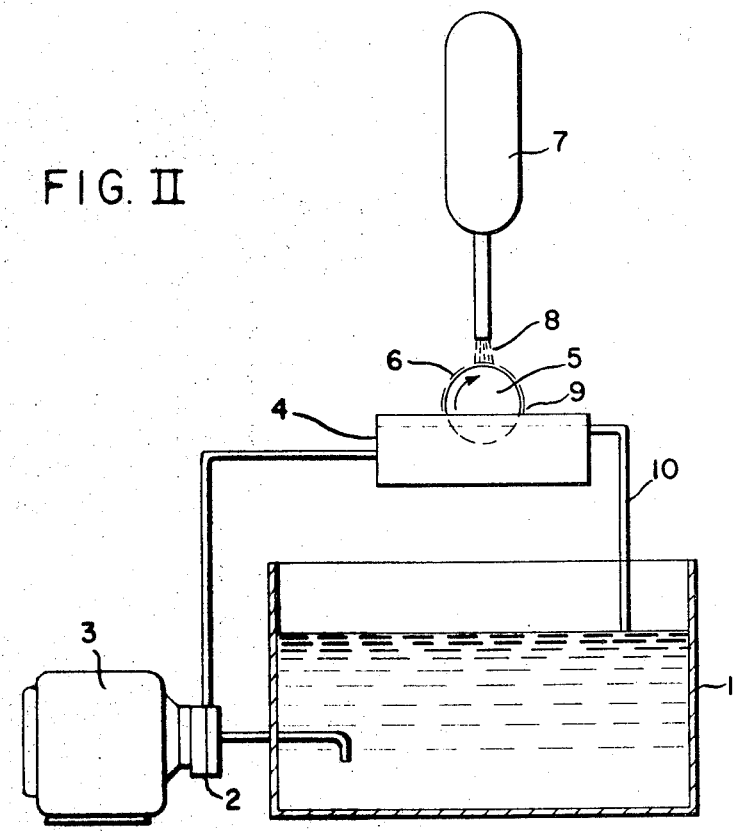
FIG. II
FIG. III
INVENTOR
JOSEPH ZIMMERMAN

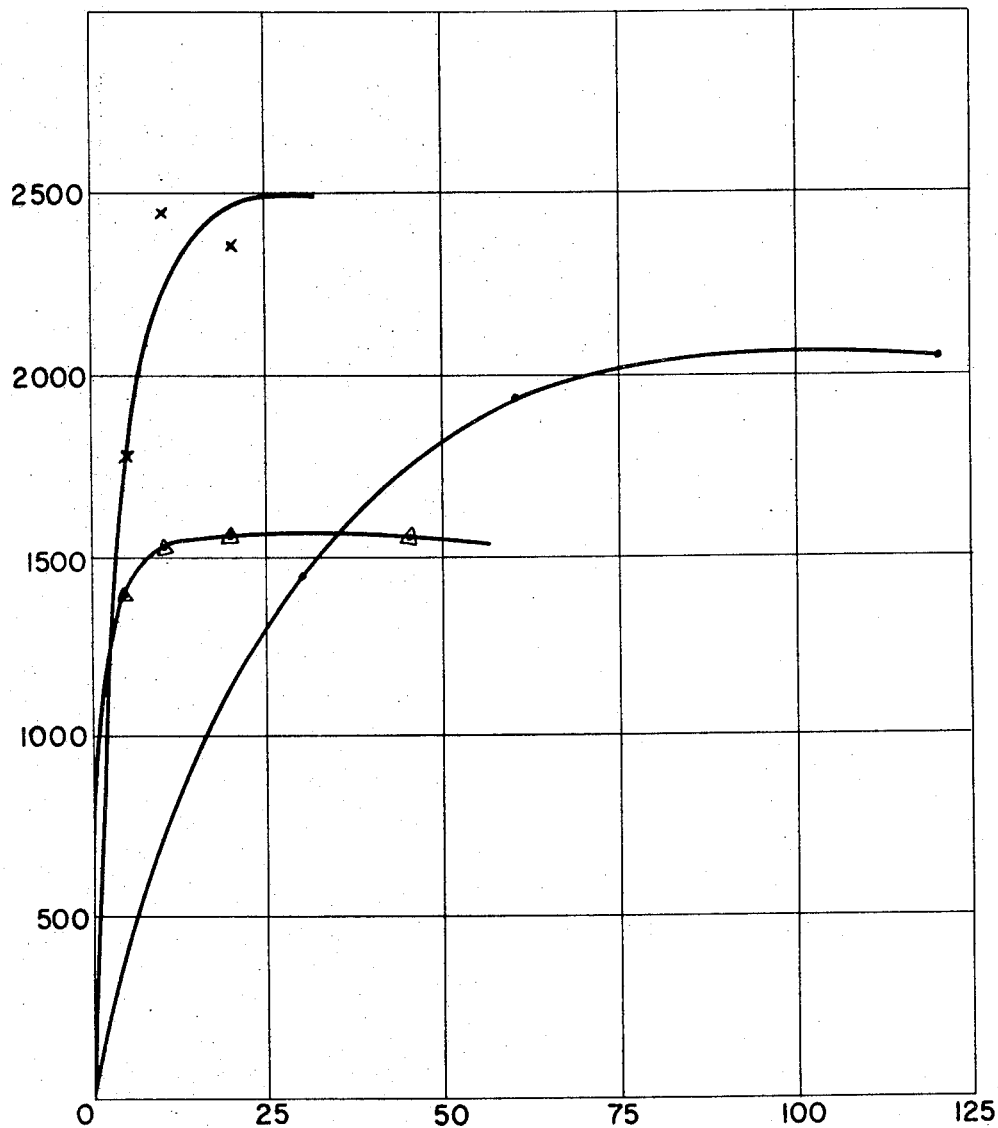
FIG. IV 3,565,780
PROCESS FOR THE PREPARATION OF GRAFT CO-
POLYMERS USING REPETITIVE IRRADIATION
AND CONTACTING STEPS
Joseph Zimmerman, Wilmington, Del., assignor to E. I.
du Pont de Nemours and Company, Wilmington, Del.,
a corporation of Delaware
Continuation-in-part of application Ser. No. 564,425,
July 11, 1966, which is a continuation-in-part of application Ser. No. 245,926, Dec. 19, 1962, which in turn is a continuation-in-part of application Ser. No. 829,028, July 23, 1959. This application Sept. 12, 1966, Ser. No. 591,940
Int. Cl. B01j *1/00;* C08f *1/00*
U.S. Cl. 204—159.15
14 Claims

A process for preparing a graft copolymer between a monomer polymerizable by free radical initiation and a polymer substrate wherein the solubility of the monomer in the substrate is less than about 10%. The process includes the steps: (1) irradiating the substrate while free from excess surface monomer to a specified free-radical concentration range and prior to the decay below a specified limit, (2) contacting the monomer with the irradiated substrate and (3) removing the excess monomer from the substrate surface and, preferably, a repetition thereof. The process, by providing for concurrent and post-irradiation grafting, results in an increased amount and greater uniformity of grafting.

---

This application is a continuation-in-part of my copending application Ser. No. 564,425, filed July 11, 1966, now abandoned, which in turn is a continuation of application Ser. No. 245,926, filed Dec. 19, 1962, now abandoned, which in turn is a continuation-in-part of my application Ser. No. 829,028 filed July 23, 1959, now abandoned.

This invention relates to a process for the preparation of graft copolymers. More specifically, it relates to a process for the preparation of graft copolymers wherein the grafting reaction is initiated by ionizing radiation.

STATE OF THE ART

Graft copolymers have been prepared by irradiating solid polymer substrates in the presence of an excess of vinyl monomer. By this process, early workers in the field have attained grafts in which large amounts of modifier are chemically bonded to the polymer substrate. However, this process suffers from a serious disadvantage in that the monomer solution is also irradiated, producing ungrafted homopolymer which serves no useful purpose and indeed represents a loss of treating material.

An alternate process, which has been employed to avoid this difficulty, is to soak the solid polymer substrate in the treating solution, remove excess treating solution by wringing, squeezing, or the like; the thus-treated substrate is then irradiated. Although this process avoids wasteful homopolymer formation, the amount of modifier grated is limited to the amount which has diffused into the polymer during the soaking process. The maximum concentration of this monomer within the polymer substrate will be determined by the equilibrium distribution of monomer between polymer and treating solution.

OBJECTS

It is an object of the present invention to provide a process for grafting large amounts of modifiers to polymer substrates, which amounts exceed the solubility limit of the modifier in the polymer wherein the solubility limit is less than about 10% by weight.

Another object is to provide a grafting process which is highly efficient with respect to use of radiation and monomer.

A further object is to provide a process for forming an irradiation graft copolymer having a high degree of uniformity of graft distribution, from surface to core, resulting in a product with highly desirable physical properties.

Still another object is to prepare a graft copolymer of relatively uniform composition by grafting vinyl polymer chains to a melt spinnable polymeric substrate in the form of chips (flake) in such a way that the graft is distributed to a greater depth within the flake than heretofore commercially practical, whereby the grafted flake may be spun to produce a high quality yarn of essentially uniform composition.

Other objects will become apparent in the course of the following specification and claims.

STATEMENT OF INVENTION

In accordance with the present invention, a process is provided for the preparation of a graft copolymer between a shaped polymer substrate and a monomer polymerizable by free radical initiation wherein the solubility of the monomer in the shaped polymer substrate is less than about 10% by weight, which comprises: (1) irradiating the said substrate free of a substantial excess of surface monomer with ionizing radiation to a free radical concentration of no greater than about $4 \times 10^{-5}$ moles per cubic centimeter of substrate and as soon as possible thereafter, in any event prior to free radical decay to less than $1 \times 10^{-8}$ moles per cubic centimeter of substrate, (2) contacting the monomer with the irradiated substrate to penetrate the substrate to form graft copolymer and to saturate the grafted substrate with a fresh supply of nongrafted monomer; (3) removing excess monomer from the surface of the saturated polymer substrate. The steps as recited are then repeated. The technique increases the amount and uniformity of the graft over that obtained employing the same operational steps at higher radiation dosage and produces a bulk modified product which may subsequently be given a surface coating, if desired, by adjustment of irradiating and contacting conditions.

The process of the present invention utilizes to the maximum the free radicals produced by radiation, (a) by grafting concurrently with irradiation and (b) by using post-irradiation grafting.

"Concurrent grafting" (a) occurs when the substrate polymer, saturated with monomer, is irradiated. The monomer is grafted concurrently with the irradiation step. The dose is merely that required to graft the monomer already uniformly distributed in the polymer by presoaking. A larger dose is merely inefficient and is not harmful except for possible secondary effects such as substrate degradation or cross-linking.

"Post-irradiation grafting" (b) occurs when the substrate is reimmersed in the monomer immediately after irradiation before the remaining free radicals decay. Since monomer to satisfy this reaction must diffuse from the bath into the substrate polymer, the free radical concentration must not exceed the specified limits, else all the monomer will be captured by the free radicals at or near the polymer surface, and none will get deep inside the substrate before the radicals become inactive. An excessively high free radical concentration thus leads to a non-uniform, surface-localized graft, which in some cases (e.g., when the polymer is insoluble in its monomer) may provide an additional barrier to monomer diffusion. It is this requirement which imposes an upper limit on the radiation dose in the process of this invention. The lower dose limit is of course imposed by the need to provide just enough free radicals for both processes (a) and (b) described above.

It will be readily seen that during the soaking step required for post-irradiation grafting (b), monomer in excess of that actually reacted will diffuse into the substrate until it is saturated, thus getting it ready for the next irradiation step.

DRAWINGS

FIG. I of the drawings is a flow sheet showing the steps of the process of this invention. The first step of "Irradiation" can be before or after contact is made between the substrate and the monomer fluid. The controlled dose as recited in the Statement of Invention is critical. The "Contact" of substrate with monomer fluid can be by immersion, spraying or padding and the fluid may be liquid or gaseous. The substrate removed from the monomer fluid is then recycled completely through the process (removing any substantial excess on the substrate prior to subsequent irradiations at controlled doses by wringing, squeezing, evaporating, washing or the like). The final irradiation and contact with the monomer is followed by recovery of grafted product, which is then usually dried. The essential steps (shown in the blocks connected by solid lines) produce the bulk graft modification (i.e., a graft produced within the body of the substrate as contrasted to a mere surface graft) which is intensified by recycling.

FIG. II is a schematic representation, discussed in greater detail in Example 1, of an apparatus for carrying out the process of the present invention in a continuous manner upon a discontinuous polymer substrate, such as a batch of polymer flake, staple fiber or the like.

FIG. III is a schematic representation discussed in greater in Example 8, of an apparatus for carrying out the process in a continuous manner on continuous lengths of polymer substrate, such as yarn, film, tow, or the like.

FIG. IV is a series of curves, as discussed in Example 7, relating modifier grafted, soaking time and temperature.

DEFINITIONS

By the term "shaped polymer substrate" as used herein is meant a shaped substrate of a solid polymer pentrated by the monomer, of the class consisting of a synthetic linear condensation polymer, a vinyl addition polymer, and natural carbonaceous cellulose, protein and polyisoprene polymers. Copolymers as well as homopolymers are, of course, included. Of the above classes, the wholly synthetic polymers are especially preferred.

By the term "synthetic linear condensation polymer" is meant a polymer which can be formed by polymerization with elimination of small molecules such as HCl, $H_2O$, NaCl, $NH_3$ and the like, including those polymers which on chemical degradation (e.g., by hydrolysis) yield monomeric end products differing in composition from the structural units (Flory, J. P., "Principles of Polymer Chemistry," Cornell Univ. Press, Ithaca, N.Y., 1953). Among such polymers may be mentioned polyamides, polyureas, polyurethanes, polyesters, polyoxymethylenes, polyethers (epoxy polymers), polyacetals, polysulfonamides, polyorganosiloxanes, and the like, and copolymers of such materials.

By a "vinyl addition polymer" is intended a polymer or copolymer which can be formed from monomers containing the group $CH_2=C$ by addition polymerization, i.e., polymerization which proceeds by combination of an unsaturated monomer with itself or with other unsaturated monomers by linkage at the olefinic bonds. Among suitable monomers for such polymerization may be mentioned styrene, the acrylic esters, vinyl chloride, vinylidene chloride, vinyl acetate, the vinyl ketones, the vinyl ethers, divinyl ether, the vinyl silanes, ethylene, propylene, the allyl esters, acrylonitrile and methacrylonitrile. Dienes which may be used include 1,3-butadiene, isoprene, chloroprene, 2,3-dimethyl-1,3-butadiene and the like. Linear, branched, isotactic and actactic polymers are highly suitable.

The concept "natural carbonaceous cellulose, protein and polyisoprene polymers" comprises those carbonaceous polymers formed in nature; the preferred polymers are those which in themselves are fibers or film or whose derivatives may be manufactured into fiber or film form. Among such materials is included cotton, flax, jute, silk, wool, fur, hair, rubber, leather, wood, regenerated cellulose, cellulose acetate, and the like.

The preferred polymers for the practice of this invention are the linear fiber-forming condensation polymers characterized by recurring amide type links as an integral part of the polymer chain. The best known representatives of this class are the polyamides, which are characterized by recurring

links in the polymer chain, when R may be hydrogen or organic radical. High molecular weight fiber-forming polyamides, now well known as "nylons," are preferred for the process of this invention.

Other well-known polymers comprehended in the defined class are the polyurethanes, characterized by recurring

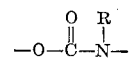

groups, and polyureas, characterized by

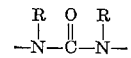

groups. Also included are those polymers with recurring main-chain links such as

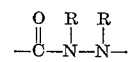

and the like. The R substituents on the nitrogen are preferably hydrogen, but may be a monovalent radical, preferably hydrocarbon radical. In addition to the above, polysulfonamides are useful.

By "graft copolymer" is meant a polymer in which the modifying agent (monomer or polymer chain) is grafted by chemical bonds, usually as a side chain, to the parent polymeric substrate.

Conventional copolymers, consisting of monomer species A and B, have a random distribution along the backbone of the polymer molecule, and may be represented schematically thus:

—AAABBABBBABAA—

The graft copolymer species with which this invention is concerned, consists of a main chain of polymer A, and side chains of polymer B grafted thereto, represented below:

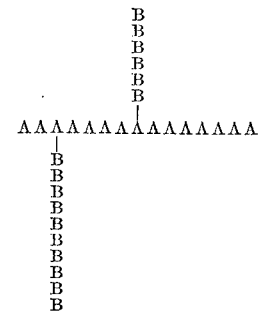

The characteristic of this copolymer type is that its gross properties remain predominantly those of the polymer (A) forming the molecular backbone. However, modifications can be produced via polymer (B) grafts, in most cases, without loss of the original desirable properties. As an example, conventional copolymers usually have a lower melting point than those of either component, while graft copolymers usually retain the high melting point of the pure backbone component. The structure and preparation of some examples of these copolymer types is discussed in a comprehensive review article by E. H. Immergut and H. Mark in Macromolekulare Chimie 18/19, 322–341 (1956).

By the expression "monomer having ethylenic unsaturation" is meant those compounds which are polymerizable by free radical mechanims. Those monomers which are especially preferred are those with vinyl unsaturation. Of these, the ones having low molecular weight (eight or less carbon atoms) are preferred, since they more readily penetrate polymeric substrates. Vinyl compounds of up to five carbon atoms are especially preferred. The expression is intended to include those monomers which are capable of homopolymerization and also those which, although not homopolymerizable, cocoplymerize when combined with one or more suitable monomers.

By "irradiation" is meant the process by which energy is propagated through space, the possibility of propagation being unconditioned by the presence of matter as distinguished from mere mechanical agitation in a material medium such as is characteristic of energy produced by a sonic or ultrasonic transducer, although the speed, direction and amount of energy transferred may be thus affected.

By "ionizing radiation" is meant radiation having sufficient energy to remove an electron from a gas atom, forming an ion pair; this requires an energy of about 32 electron volts (ev.) for each ion pair formed. This radiation has sufficient energy to nonselectively break chemical bonds; thus, in round numbers radiation with energy of 50 electron volts (ev.) and above is effective for the process of this invention, although energies of 50,000 ev. and over are desirable. The ionizing radiation of the process of this invention is generally classed in two groups: high energy particle radiation, and ionizing electromagnetic radiation. The effect produced by these two types of radiation is similar, the essential requisite being that the incident particles or photons have sufficient energy to break chemical bonds and generate free radicals.

The preferred radiation for the practice of this invention is high energy ionizing particle radiation; for maximum utility, when using this type of radiation, energy equvalent to at least 0.1 million electron volts (mev.) is preferred. Higher energies are even more effective; there is no known upper limit, except that imposed by available equipment.

The term "solubility" as used herein refers to the physical penetration of the polymer substrate by the monomer at "saturation." When the polymer substrate is contacted with monomer for sufficient time (e.g., greater than 24 hours), the polymer is said to become "saturated" with monomer. At "saturation" all of the monomer which can physically penetrate the polymer has done so, and the solubility limit (i.e., "saturation") is reached. It is of course apparent that the solubility limit will depend on the contacting temperature, and the monomer solution composition, as well as on the monomer and polymer involved. The "solubility limit" therefore refers to the composition and conditions actually employed in the soaking step.

EXPERIMENTAL PROCEDURES AND UNITS

Compositions are given in parts by weight or weight percent, unless otherwise noted.

Radiation dosages are given in units of "mrad." (millions of rads), a "rad." being the amount of high energy radiation of any type which results in an energy absorption of 100 ergs. per gram of absorbing material.

In determining "hot-wet recovery" reported in the following examples, a piece of the yarn is knotted to form a loop, and from it is suspended a three gram weight. The loop is hung on a pin 0.03 inch in diameter, and the combination is immersed in water at 60° C. for a period of 5 minutes. The pin with the loop suspended therefrom is removed, cooled, and blotted gently with a towel to remove excess moisture. The loop has acquired a 360° bend by this treatment. The loop is then placed free in the 60° C. water (without the pin or the weight) for one minute; it is then removed, cooled to room temperature, blotted lightly, and percent recovery from the 360° bend is measured. This is labelled "hot-wet recovery."

The following examples are cited to illustrate the process of the invention grafting to polyhexamethylene adipamide substrate. They are not intended to limit it in any way.

EXAMPLE 1

A slurry of polyhexamethylene adipamide flake cut to pass a 1/8" mesh screen is prepared in tank 1 of FIG. II; the treating solution is 25% N-vinylpyrrolidone in water. A ratio of 10 parts of treating solution to one part of flake is employed. After soaking for 12 hours, the pump 2 is started, recirculating the slurry. The soaked polymer flake is picked up by rotary vacuum filter 5 from trough 4 and is carried under the beam of one mev. electrons as a filter cake 6. After irradiation under the beam 8 of a 2 mev. Van de Graaff accelerator 7, the flake is blown from the filter at point 9 and is reimmersed in the treating solution about 2–3 seconds after irradiation. Excess polymer-monomer slurry overflows through pipe 10 returning to slurry tank 1. The average residence time in the solution is about 4½ minutes per pass. The equipment is operated so that each flake particle receives, on each pass, 0.05 mrad radiation dose, generating about $0.3 \times 10^{-6}$ moles of free radicals per cc. of polymer. The equipment is operated until the accumulated dose, on the average, is 0.67 mrad. The flake is found to have gained 9% in weight due to grafted N-vinylpyrrolidone, and an analysis of the treating solution shows less than 0.5% of polyvinylpyrrolidone. The drained, grafted flake is rinsed in distilled water, dried, and melt spun to yarn.

In using the apparatus described adjustment of slurry concentration, recirculation rate and filter characteristics determines the average number of times any given flake particle passes through the electron beam. The average dose per pass is adjusted, by varying electron tube current and filter rotation rate, so that sufficient radiation dose is accumulated to produce the desired amount of grafting. The filtrate removed from the vacuum filter is separated from excess air and is returned to tank 1 by conventional means, not shown. The apparatus which may be used to treat any discontinuous form of polymer such as flake or staple fiber is readily adapted to provide a continuous throughput. In this embodiment, a side stream of treated slurry is removed from tank 1, treating solution is separated from slurry and returned to the tank. The grafted product is removed for washing, drying and further processing. Make-up polymer and treating solution are introduced into tank 1 by conventional metering means. Alternatively a series of troughs 4, electron beams 8 and vacuum filters 5 may be employed with the flake or fiber and monomer slurry being pumped from one to the other.

The apparatus illustrated uses the same monomer solution bath for presoaking and post-soaking the flake. Where different conditions (of time, temperature, concentration or type of monomer) are desired for these two steps, it is merely necessary to add an auxiliary tank, containing the post irradiation treating solution, placed so as to receive the irradiated flake as it is blown from the filter at 9. This arrangement has the added advantage, even when similar conditions of soaking are used for each process cycle, of accurately controlling the total exposure of each polymer flake to the beam.

EXAMPLE 2

A series of samples is prepared to show the improvements obtained by a single stage of the process of this invention as compared to prior art processes. The samples are prepared according to the following sequences. One part of polyhexamethylene adipamide flake, ground to a fineness such so that 50% passes through a 70 mesh sieve, is soaked for three hours at room temperature in two parts of 40% aqueous N-vinylpyrrolidone solution. Sample A is prepared by placing 210 grams of the slurry so prepared in a Buchner funnel having an area of 117 square centimeters which is attached to a vacuum line and placed under the two mev. Van de Graaff electron accelerator. Vacuum is applied to the funnel, removing excess treating solution and leaving a filter cake containing about 30% treating solution, i.e., 70 grams nylon and 30 grams of soaking solution. The sample with a density of about 0.56 gram per square centimeter, readily penetrated by the 2 mev. electrons (penetration 0.7 gram per square centimeter), is irradiated to a dose of one mrad to produce $6 \times 10^{-6}$ moles free radical per cubic centimeters of polymer, and then immediately the cake is resoaked with monomer solution by adding 210 grams of fresh 20% aqueous N-vinylpyrrolidone solution. The sample is permitted to soak in the solution (following the irradiation) for three hours at room temperature. Sample B is prepared similarly, except that additional treating solution is not added to the filter cake following the irradiation. A third sample, C, is prepared by taking 100 grams of the original slurry and irradiating it (without removing excess liquid) under the electron beam. It is allowed to remain in contact with the solution in which it was irradiated, for three hours after the irradiation. Following this treatment, each sample is washed well in hot distilled water to remove ungrafted polymer, and the weight gain is determined. The solutions used in treating the flake are analyzed for monomer and polymer content, with the results indicated in the following table.

TABLE I

| | | | Solution compositions | | | |
| | | | Pretreating | | Post-treating | |
| Processing sequence | | Percent PVP[1] grafted | Percent NVP[2] | Percent PVP | Percent NVP | Percent PVP |
|---|---|---|---|---|---|---|
| Sample: | | | | | | |
| A | (1) Soak 3 hrs.; (2) Drain; (3) Irradiate; (4) Soak 3 hrs. | 24.4 | 32.7 | 0.009 | 30.3 | 0.7 |
| B | (1) Soak 3 hrs.; (2) Drain; (3) Irradiate. | 7.6 | 29.6 | 0.005 | None used | |
| C | (1) Irradiate in solution; (2) Soak 3 hrs. after irradiation. | 36.5 | | | 16.4 | 12.7 |

[1] PVP-polyvinylpyrolidone.
[2] NVP-vinylpyrrolidone.

It is obvious that the most efficient operation is obtained with Sample A, illustrating the process of the invention. Sample B shows a much lower weight gain for the same irradiation dose; the maximum weight gain by this process is limited to this amount by the solubility of NVP in nylon which in this case is about 7%. Sample C, although showing a high weight gain, has a large loss of treating monomer due to irradiation-induced homo-polymerization, and has a less uniform distribution of graft from surface to core.

EXAMPLE 3

Skeins of two denier (0.22 tex.) per filament, drawn polyhexamethylene adipamide yarn are soaked in a solution of 50 parts acrylonitrile, 25 parts methanol and 25 parts water for 5 minutes at 50° C. The skeins are squeezed between filter paper to remove excess treating solution and are then cooled on a bed of Dry Ice. The skeins are irradiated with two mev. electrons, at this temperature, to a dose of one mrad. (free radical concentration of $6 \times 10^{-6}$ moles/cc.). Irradiation at this temperature preserves the free radicals by preventing them from reacting (or degrading) until the substrate is warmed by immersion in the monomer solution. This technique makes it easier to handle small experimental samples, but is not required commercially, where mechanical methods (e.g., as in Example 1) may be employed to bring the polymer and monomer into as rapid contact as quickly as possible after irradiation.

Following irradiation, the skeins are immediately reimmersed in the treating solution. After 5 minutes, the process is repeated. Samples are removed after 5, 8 and 12 such treatments. Nongrafted polyacrylonitrile (if any) is removed by extraction with dimethylformamide, the skeins are dried and the weight gain and initial modulus of elasticity are determined, with the results shown in the table. Control Sample A is not irradiated after soaking in the acrylonitrile solution; control E is irradiated but not soaked in acrylonitrile. The solubility of acrylonitrile in nylon using water-methanol solvent at 50° C. is 8 to 10%.

TABLE II

[Two denier per filament nylon with grafted polyacrylonitrile]

| | Total dose, mrad. | No. of cycles | Polyacrylo-nitrile percent grafted | Yarn modulus grams/denier |
|---|---|---|---|---|
| Sample: | | | | |
| A | 0 | 0 | [1] | 24 |
| B | 5 | 5 | 130 | 38 |
| C | 8 | 8 | 230 | 44 |
| D | 12 | 12 | 346 | 51.5 |
| E | 12 | | [1] | 24 |

[1] None.

EXAMPLE 4

Undrawn 150 denier (16.5 tex.), 34 filament polyhexamethylene adipamide yarn is treated in accordance with the process of Example 3. The yarn is subjected to twelve cyclic treatments, with a total dose of 12 mrad. The weight gain is 240%, due to grafted polyacrylonitrile. The yarn is then drawn, in superheated steam to a draw ratio of 3.0X. X-ray examination of the drawn, grafted filaments shows that not only the nylon core is oriented, but also the polyacrylonitrile graft. When the yarn is boiled off on the bobbin, at constant length, it has a tenacity of 2.34 grams per denier at 18% elongation. The initial modulus is 48 grams per denier. When the yarn is boiled off in a relaxed condition (free to shrink) it shows a shrinkage of 20%. This compares to a boil-off shrinkage of about 11% for unmodified nylon. The grafted yarn is thus suitable for combination with ungrafted nylon in preparing plied yarn. A novel "bulked" fabric is produced when the plied yarn is woven and boiled off.

EXAMPLE 5

A skein of drawn 70 denier (7.8 tex), 34 filament polyhexamethylene adipamide yarn is soaked in a solution of 15 parts methylene-bis-acrylamide, 42½ parts methanol, and 42½ parts water at 70° C. for 5 minutes. The skein of yarn is removed, excess solution is removed by squeezing, the skein cooled to Dry Ice temperature, and is then irradiated with two mev. electrons to a dose of one mrad. (free radical concentration of $6 \times 10^{-6}$ moles/cc.). The weight gain is 11% which approximates the solubility limit in nylon. The skein is then immediately reimmersed in the 70° C. treating solution for 5 minutes post-irradiation soaking. The process is repeated three times (3 mrad. total) giving a total weight gain of 35% (Sample A). Analysis of the grafted yarn for unreacted carbon-carbon double bonds shows 445 moles of double bonds per million grams of polymer. This shows that 73.5% of the second double bonds in the methylene-bis-acrylamide are reacted, to produce 615 moles of cross-links per $10^6$ grams of total fiber.

When the process is repeated, to a total of four cycles (4 mrad.), a weight gain of 51% is observed (Sample B). The hot-wet recovery of Sample B is 90%.

Another sample, C, is prepared by irradiating a skein of the original yarn while immersed in the methylene-bis-acrylamide solution to a total dose of 10 mrad. (free radical concentration of $60 \times 10^{-6}$ moles/cc.). After removing nongrafted material, the weight gain is 53%. When subjected to the hot-wet recovery test described above, Sample C shows a recovery of only 76%. Thus the much more massive irradiation dose applied to Sample C in a single step grafts substantially the same amount of monomer as the much lower dosage applied by the process of the present invention to Sample B. In addition, the hot-wet recovery properties of Sample B are much superior to Sample C. Unmodified nylon has a hot-wet recovery of about 65%. The high wet recovery of Sample B indicates high potential for use in wash and wear fabrics.

EXAMPLE 6

This example illustrates the necessity of controlling free radical concentration to provide a uniform rate of monomer penetration and hence, the graft distribution in the polymer substrate. As will be evident from the example, unnecessarily large doses of irradiation are not only inefficient in terms of amount of graft per unit dose, but actually hinder penetration by monomer on subsequent monomer-substrate contact, thus causing uneven graft distribution through the body of the substrate.

In this example, the polymer substrate is first irradiated at Dry Ice temperature, then is exposed to monomer vapors. Soaking (or vapor exposure) prior to irradiation is avoided, so that the effect exemplified is more noticeable.

A skein A of 60 denier (6.7 tex) undrawn polyhexamethylene adipamide monofilament yarn is sealed under nitrogen in a polyethylene bag, and is irradiated with 2 mev. electrons at −78° C. to a dose of 1 mrad., producing a free radical concentration of $6 \times 10^{-6}$ moles/cc. The skein is then placed in the neck of a flask provided with a reflux condenser, and is exposed for 30 minutes to the vapor and liquid condensate of boiling 4-vinyl pyridine (temp. about 135° C.). The skein A is then extracted with hot methanol to remove ungrafted material; after drying its weight gain is 20%. Cross sections of the yarn, after dyeing with an acid dye, C.I. Acid Blue No. 78, show uniform dyeing throughout the fiber cross section, as shown at A of FIG. IVa.

When the test is repeated, with yarn skein B, except that a dose of 10 mrad. is used, producing a free radical concentration of $6 \times 10^{-5}$ moles/cc., a weight gain of 22% is observed, but the graft is nonuniformly distributed, being concentrated near the surface of the fiber. Even though exposed to monomer for the same time and under the same conditions of monomer concentration and temperature as Sample A, the monomer did not penetrate Sample B uniformly due to the excessively high concentration of free radicals. From 3 to 5% vinyl pyridine will dissolve in undrawn nylon at 135° C.

EXAMPLE 7

The effect of post-irradiation temperature and soaking time on graft uniformity are shown in this example, using the special irradiation techniques of Example 6.

Skeins of 70 denier (7.8 tex.) 34 filament polyhexamethylene adipamide yarn are prepared to carry out a series of tests, in which the yarn (irradiated at −78° C. as in Example 6 to a dose of 1 mrad.) is soaked in inhibitor-free (less than 0.007% inhibitor, based on acid) 8.60% aqueous acrylic acid at 25° C., 50° C. and 75° C. for various time intervals, as shown in the table below. After washing in distilled water to remove ungrafted monomer, the equivalents of carboxyls per $10^6$ gram polymer are determined, according to the procedure of Taylor and Waltz (Anal. Chem., 19, 448, 1947). These results are also listed in the table. Values obtained are corrected for the —COOH ends originally present (80) on the unmodified nylon. The solubility of acrylic acid in nylon using the 8.6% solution is also given (designated Sol. percent).

Portions of each sample are dyed using a basic dye, Color Index Basic Green 1, and cross sections of the yarn are examined under the microscope. The portion of the yarn to which acrylic acid is grafted are deeply dyed.

TABLE III

| Series | Soak temp., °C. | Sol. percent | —COOH/$10^6$ gm. polymer at time (minutes) | | | | |
|---|---|---|---|---|---|---|---|
| | | | 1 | 15 | 30 | 60 | 120 |
| a | 25 | 5.5 | [1] (507) | 703 | 1,445 | 1,945 | 2,050 |
| | | | 1 | 5 | 10 | 20 | |
| b | 50 | 6.0 | [1] (1,260) | 1,790 | 2,436 | 2,365 | |
| | | | 1 | 5 | 10 | 20 | 40 |
| c | 75 | 6.3 | [1] (1,360) | 1,393 | 1,513 | 1,538 | 1,536 |

[1] Estimated from curves.

From these data, the grafting rate is readily determined at any temperature and time, from the slope of the line obtained by plotting percent weight gain (or increase in —COOH equivalents/$10^6$ gm.) against time.

Curves showing this relation are given in FIG. IV wherein equivalents of carboxyls grafted per $10^6$ grams of substrate is plotted as ordinate against soaking time in minutes as abscissa. Inspection of the curves shows immediately that there is little advantage (in increased weight gain) in prolonging the soaking step beyond 60, 20 and 10 minutes at 25, 50 and 75° C., respectively.

The time required for the soaking step includes the time required for the acrylic acid to diffuse into the substrate, react with the free radicals and graft copolymerize onto the nylon. Diffusion of acrylic acid into the nylon without grafting also occurs simultaneously, so that at the end of the post-reaction period, the grafted substrate has again become saturated with the monomer and is ready for another dose of radiation.

EXAMPLE 8

Using the apparatus of FIG. III, a tow of polyhexamethylene adipamide yarn 11 is passed over roller 12 and is soaked in an 8.60% aqueous acrylic acid solution contained in tank 19. Passing over direction-changing rollers 13, excess solution is removed on passing between squeeze rollers 14. The tow then passes over roller 15 and thence through the electron beam 8 produced by the electron accelerator 7. The irradiated tow is thereafter reimmersed in the soaking solution after passing over roller 16. The process is repeated subjecting the wetted but wrung tow to irradiation and reimmersion a total of four times, the grafted tow then leaving the equipment at 17, after passing between squeeze rolls 18. Although four passes under the beam are illustrated, it is obvious that more or fewer passes could be employed. Since the irradiation dose reaching the tow will diminish for each pass (in this embodiment) due to absorption by the product layers preceding it, it will be desirable to keep the total product thickness irradiated to a value which will be readily penetrated. Alternatively, the product may be passed through the beam in a side by side arrangement, instead of in superimposed layers, thus obtaining the same radiation dose on each pass. The apparatus is suitable for treating continuous flexible lengths of product, such as sheet, film, yarn, tow, cord, fabric or the like.

EXAMPLE 9

Eight strips (1" x 5") of low-density polyethylene film (5 mils thick) are cooled in Dry Ice; one of these serves as control, and is not irradiated. The other seven are exposed to the 2 mev. electron beam, to a dose of 1 mrad., while they are maintained at Dry Ice temperature. The free radical concentration is about $4 \times 10^{-6}$ moles/cc. All eight samples are then immersed in boiling vinyl acetate (72° C.) for 5 minutes. The samples are removed, wiped dry, and cooled as before. Six of the previously irradiated samples are again irradiated, reimmersed in vinyl acetate for five minutes, and so on. A sample representative of the cumulative treatment is removed after each soaking step, and its weight gain and area is determined, with the results given in Table IV.

TABLE IV
[Polyethylene grafted with vinyl acetate]

| Sample: | Accum. dose, mrad. | Accum. time in vinyl acetate, min. | Wt. gain, percent | Area in.² |
|---|---|---|---|---|
| a (control) | 0 | 35 | 0 | 5 |
| b | 1 | 5 | | |
| c | 2 | 10 | 20 | |
| d | 3 | 15 | 55 | 6.2 |
| e | 4 | 20 | 93 | 6.8 |
| f | 5 | 25 | 154 | 8.1 |
| g | 6 | 30 | 201 | 9.1 |
| h | 7 | 35 | 265 | 13.0 |

The samples increase appreciably in area due to the grafting. It is noted that the amount grafted increased more rapidly than the accumulated dose.

When a sample of the same film is presoaked in vinyl acetate for two days, then wiped dry, it is found to have gained 2.2% in weight, which corresponds to the solubility (at room temperature) of this monomer in the polyethylene. When the sample is irradiated to a dose of 1 mrad., the weight gain (after extraction) is 2.0%, indicating that about 85% of the monomer absorbed was grafted. The solubility of vinyl acetate at the soaking temperature, 70° C., is between 5 and 7 percent.

The preceding test is repeated under carefully controlled conditions, to show the increased efficiency of the claimed process over prior art processes which merely soak and then irradiate, without taking advantage of the activity of the free radicals remaining after the irradiation step.

In this test, strips of 4-mil thick polyethylene of 0.92 gm./cc. density are cleaned with carbon tetrachloride, dried and weighed. The strips are cooled and irradiated In this test, strips of 4-mil thick polyethylene of 0.92 to a dose of 1 mrad on a bed of Dry Ice using 2 mev. electrons; they are then immersed for 5 minutes at room temperature in vinyl acetate which had been freshly distilled. The soaking temperature is 70° C. One sample is withheld, dried and weighed; the others have excess vinyl acetate removed by blotting with a paper towel, then the irradiation and soaking steps are repeated. One sample is removed after each cycle. The results are given in Table V.

The test is repeated, with the exception that the film samples, following each irradiation, are held for ten minutes to allow the remaining free radicals to decay. The results obtained are listed under the columns "Prior Art Process" in Table V.

Examination of the data shows that the process of the invention provides a greater weight gain than the prior art process.

EXAMPLE 10

The procedure of Example 9 (Table IV) is repeated, using various polymer-monomer combinations. The data are reported in Table VI.

TABLE V

| | | Process of invention | | Prior art process | |
|---|---|---|---|---|---|
| | Accum. dose, mrad. | Total wt. gain, percent | Increment of wt. gain, percent | Total wt. gain, percent | Increment of wt. gain, percent |
| Sample: | | | | | |
| 1 | 1 | 14.5 | 14.5 | 4.9 | 4.9 |
| 2 | 2 | 29.2 | 14.7 | 16.6 | 11.7 |
| 3 | 3 | 51.3 | 22.1 | 32.4 | 15.8 |
| 4 | 4 | 90.7 | 39.4 | 53.3 | 20.9 |
| 5 | 5 | 130.5 | 39.8 | 61.8 | 8.5 |
| 6 | 6 | 170.5 | 40.0 | 95.2 | 33.4 |
| 7 | 7 | 208.2 | 37.7 | 128.0 | 32.8 |

TABLE VI

| | Polymer | Monomer treating solution | Dose/ cycle, mrad. | Total dose, mrad. | Estimated free radical per cycle moles/cc. | Acc. treating time, min. | Treating temp., °C. | Wt. gain percent |
|---|---|---|---|---|---|---|---|---|
| Sample: | | | | | | | | |
| (a) | A | C | 1.0 | 2 | $6 \times 10^{-6}$ | 10 | 60 | 5 |
| (b) | A | C | 1.0 | 4 | $6 \times 10^{-6}$ | 20 | 60 | 9 |
| (c) | A | C | 1.0 | 6 | $6 \times 10^{-6}$ | 30 | 60 | 15 |
| (d) | A | C | 0 | 0 | (a) | 30 | 60 | 0 |
| (e) | A | D | 1.0 | 3 | $6 \times 10^{-6}$ | 15 | 78 | 4 |
| (f) | A | D | 1.0 | 6 | $6 \times 10^{-6}$ | 30 | 78 | 8.5 |
| (g) | A | D | 0 | 0 | (a) | 30 | 78 | 0 |
| (h) | B | E | 1.0 | 4 | $1 \times 10^{-6}$ | 20 | 78 | 7 |
| (i) | B | E | 1.0 | 8 | $1 \times 10^{-6}$ | 40 | 78 | 17 |
| (j) | B | E | 0 | 0 | $1 \times 10^{-6}$ | 40 | 78 | 0 |
| (k) | B | F | 1.0 | 6 | $1 \times 10^{-6}$ | 30 | 70 | 22 |
| (l) | B | G | 1.0 | 3 | $1 \times 10^{-6}$ | 15 | 78 | 3 |
| (m) | B | G | 1.0 | 6 | $1 \times 10^{-6}$ | 30 | 78 | 7.5 | a Control.
NOTE.—A=66 nylon-taffeta (4" x 6"); B=Polyethylene terephathlate 4" x 8" x 0.005" fiber mat; C=50/50 vinyl acetate/methanol (vol.); D=100% ethyl acrylate; E=100% acrylonitrile; F=100% styrene; G=100% ethyl acrylate.

OPERABLE MONOMERS

As stated hereinabove, the monomers operable for the process of this invention are those which are polymerizable by free radical mechanisms; thus, such monomers are characterized by one or more units of vinyl or other ethylenic unsaturation. Monomers of low molecular weight are preferred, since they penetrate the polymer substrate more readily. Thus, monomers with carbon chains of no more than five carbon atoms are especially preferred. However, bulk grafting of readily penetrable substrates such as cotton and wool is readily obtained with monomers having twenty or more carbon atoms.

Thus, suitable monomers include hydrocarbons such as ethylene, propylene, styrene, alpha-methyl styrene, divinyl benzene, 1,3-butadiene, 2,3-dimethyl-1,3-butadiene, 2-chloro-2,3-butadiene, isoprene, cyclopentadiene, chloroprene; acids such as maleic acid, crotonic acid, dichloromaleic acid, furoic acid, acrylic acid, methacrylic acid, undecylenic acid, cinnamic acid; amides such as acrylamide, methacrylamide, N-methylolacrylamide, N-methyl-N-vinyl formamide, N-vinyl pyrrolidone, vinyl oxyethyl formamide, methylene-bis-acrylamide, N-allylcaprolactam; acrylate esters such as methyl acrylate, ethyl acrylate, benzyl acrylate, octyl acrylate, methyl methacrylate, butyl methacrylate, vinyl acrylate, allyl acrylate, ethylene diacrylate, diallyl itaconate, diethyl maleate, N,N-diethylaminoethyl methacrylate, dihydroxy dipyrone; nitroles such as acrylonitrile, methacrylonitrile; acrylyl halides such as acrylyl chloride; vinylic alcohols such as allyl alcohol, furfuryl alcohol, 3-hydroxycyclopentene, dicyclopentenyl alcohol, tropolone; aldehydic compounds such as acrolein, methacrolein, crotonaldehyde, furfural, acrolein diethyl acetal; vinyl amines such as vinyl pyridine, allyl amine, diallyl amine, vinyl oxyethylamine, 3,3-dimethyl-4-dimethylamino-1-butene, N,N-diacryltetramethylene diamine, N,N-diallyl melamine, diamino octadiene; quaternized amines such as tetraallyl ammonium bromide, vinyl trimethyl ammonium iodide, the quaternary methiodide of methylene - 3 - aminomethylcyclobutane; vinyl esters such as vinyl acetate, vinyl salicylate, vinyl stearate, allyl formate, allyl acetate, diallyl adipate, diallyl isophthalate; vinyl ethers such as allyl glycidyl ether, vinyl 2-chloroethyl ether, dihydropyrane, methoxy polyethyleneoxymethacrylate; vinyl halides such as vinyl chloride, vinyl fluoride, tetrachloroethylene, tetrafluoroethylene, 1,1 - dichloro-2,2-difluoroethylene, vinylidene chloride, hexachloropropene, hexachlorocyclopentadiene, p-chlorostyrene, 2,5-dichlorostyrene, allyl bromide, 2-bromoethyl acrylate, vinyl tetrafluoropropionate, perfluoroacrylates such as 1,1,7-trihydroperfluoroheptyl acrylate; isocyanate type compounds such as vinyl isocyanate, acrylyl isocyanate, allyl isothiocyanate; vinyl ketones such as methyl vinyl ketone, ethyl vinyl ketone; cyanides such as methacrylyl cyanide, allyl isocyanide; nitro compounds such as 2-nitropropene, 2-nitro-1-butene; phosphorous containing vinyls such as diethyl vinyl phosphate, diphenyl vinyl phosphine oxide, 1-phenyl-3 phosphacyclopentene-1-oxide, diallyl benzene phophonate, potassium vinyl phosphonate, bischloroethyl vinyl phosphonate; also included are alkyl, aryl, aralkyl phosphonates, phosphites and phosphonates; sulfur containing vinyls including sulfonates, sulfonamides, sulfones, sulfonyl halides, thiocarboxylates, such as diallyl sulfide, ethylene sulfonic acid, allyl sulfonic acid, methallyl sulfonic acid, styrene sulfonic acid, 2-methylpropene-1,3-disulfonic acid, also including salts and esters of the sulfonic acids; epoxy vinyls, such as butadiene oxide, 2,2-diisobutylene oxide, glycidyl methacrylate.

Acetylenes such as phenylacetylene, acetylene dicarboxylic acid, propiolic acid, propargylsuccinic acid, propargyl alcohol, 2 - methyl - 3 - butyn - 2 - ol, 2,2,3,3-tetrafluorocyclobutylvinylethyne and the like may be used successfully.

Variables affecting each of the process steps are discussed individually hereinbelow.

Penetration

In order to achieve bulk grafting according to the process of this invention, the conditions of contact of polymer substrate and monomer are so chosen that the polymer is, at least to some extent, penetrable by the chosen monomer. Ease of penetration may be improved by the use of a swelling agent for the polymer substrate, either as a solvent for the monomer or as a pretreatment for the polymer before contacting with the vinyl monomer. As previously stated, the monomer should be preferably of a low molecular weight; those monomers which have a swelling action for the polymer substrate are usually more readily grafted throughout the substrate. However, the monomer is usually chosen for its functional effect in modifying substrate properties such as increasing the melting point, improving dye receptivity, improving wash wear properties and the like, rather than for its mere ability to penetrate the polymer.

Where the monomer is a solvent for the substrate polymer, contact between the two is of limited duration so that the solid polymer is not dissolved or degraded. Alternatively, a monomer diluent may be chosen which will keep the polymer from dissolving.

The solid polymer substrate may be exposed to the vinyl monomer as a vapor; the penetration rate will usually be increased by carrying out the exposure under pressure. Alternatively, the monomer may be applied as a liquid or as a solution. In general, it is preferred to apply the monomer as a solution, and those solvents should be chosen which have a swelling effect on the substrate. A wetting agent in the treating solution may be beneficial. Such liquids may be applied by immersion, spraying, padding or the like.

It has been observed that in any system of substrate and fluid penetrable monomer, an equilibrium exists which determines the distribution of monomer between the fluid phase and the polymer phase. This equilibrium can be shifted.

Obviously, those changes which increase the equilibrium concentration of monomer in the polymer will increase grafting efficiency. For example, it is often beneficial to add a substance to the monomer solution which decreases the solubility of the monomer in the solvent. As an illustration, adding sodium sulfate to sodium styrene sulfonate solution in which nylon is immersed increases the concentration of sodium styrene sulfonate in the nylon at equilibrium. In addition solvents may also be chosen which have relatively low affinity for the monomer. This will often increase the equilibrium concentration of monomer in the polymer substrate.

Although it is apparent that maximum amounts of the modifier are introduced into the polymer substrate if it is exposed to the monomer until equilibrium is attained at the temperature and monomer activity existing in the "penetration" step, an impractically long exposure time may be required, especially when treating thick substrates, such as polymer flake. Small graft non-uniformities introduced into the flake will usually be eliminated during the reshaping (e.g., spinning) operation.

When treating substrates with at least one small dimension, e.g., fiber or film, equilibrium penetration or the monomer is usually easily attained in the soaking bath. However, increased efficiency will often result if the polymer substrate is removed from the monomer treating bath just before equilibrium is reached since the step of removal of substantial excess of monomer will not ordinarily remove all the adhering film of monomer, monomer diffusion into the substrate continues up to the moment of irradiation, preferably reaching equilibrium at that time.

When the irradiation step is carried out at low (e.g., Dry Ice) temperatures, the free radicals are "frozen" and retained indefinitely. If monomer remains on the substrate surface under these low-temperature conditions, it will start to diffuse in at once, on warming, and will thus be available for grafting within the substrate.

Increased soaking temperatures have a very large effect upon the rate of diffusion of the monomer into the polymer substrate during the grafting process; this effect is much greater than that predicted from the temperature coefficient of diffusion. However, since optimum conditions for effecting penetration depend to a significant degree on the past history of the substrate (e.g., whether it contains free radicals), discussion of process conditions to obtain penetration is continued in the section on the contact step of the process.

REMOVAL OF EXCESS TREATING SOLUTION

For efficient use of monomer, any substantial excess of treating solution is removed before irradiation. Where a volatile monomer is employed, the excess may be swept out of the irradiation vessel, for example, by a currrent of inert gas. However, this is usually not necessary, since such surface monomer will evaporate rapidly before the irradiation, which is not usually carried out in a confining vessel. Where liquids and solutions are employed, the treated substrate should be drained, centrifuged, passed through a wringer, or filtered under vacuum. Preferably, conditions in this step are adjusted so that the product reaches the irradiation zone at approximately the same temperature employed in the previous "soaking" step. It has been noted that small amounts of monomer on the surface of the substrate may contribute greatly to increased weight gain.

IRRADIATION

The ionizing radiation suitable for the process of this invention should have a minimum energy of at least about 50 electron volts. However, the preferred energy of such radiation should be at least 0.1 million electron volts (mev.). Such radiation generally falls in two classes: high energy particle radiation and high energy electromagnetic radiation. The high energy particle radiation is an emission of highly accelerated electrons or nuclear particles such as protons, neutrons, alpha-particles, deuterons, or the like, directed so that the said particle impinges upon the polymer substrate bearing the monomer. The charged particles may be accelerated to high speeds by means of a suitable voltage gradient using such devices as a resonant cavity accelerator, a Van de Graaff generator, a betatron, a synchrotron, a cyclotron, or the like as is well known to those skilled in the art. Neutron radiation may be produced by bombardment of selected light metal (e.g., beryllium targets with high energy positive particles). In addition, particle radiation suitable for carrying out the process of the invention may be obtained from an atomic pile, or from radioactive isotopes or from other natural or artificial radioactive materials.

Ionizing electromagnetic radiation useful in the process of this invention is produced when a metal target (e.g., gold or tungsten) is bombarded by electrons with appropriate energy. Such energy is imparted to electrons by accelerating potentials in excess of 0.1 mev. Such radiation, conventionally termed X-ray, will have a short wave length limit of about 0.01 angstrom unit (for one mev.) and a spectral distribution of energy at longer wave lengths determined by the target material and the applied voltage. In addition to X-rays produced as indicated above, ionizing electromagnetic radiation (i.e., gamma radiation) may be obtained from a nuclear reactor ("pile") or from natural or artificial radioactive material, for example, cobalt 60.

The preferred radiation for the process of this invention is high energy electrons, due to the ready availability of equipment for producing such electron beams, and the rapidity with which the effects are attained, e.g., in a matter of seconds, thus promoting a high rate of product throughout.

There is no known upper limit to the particle energy effective in the process of this invention, except that imposed by present day equipment. Thus, energies equivalent to 24 mev. to 100 mev. may be used.

For maximum grafting efficiency, total radiation dose, processing time and monomer losses should be kept to a minimum, while grafting the required weight of monomer. To attain this efficiency, proper control of the dose per process cycle is required. Example 6 shows that high dose resulted in a product having nonuniform graft distribution, the graft being concentrated at the surface of the substrate. Therefore, lower doses per process cycle are essential.

It has been found that as the dose (per cycle) is decreased, a point is reached when further reductions do not lead to improvements in efficiency; this is believed to be due, in part, to the effect of small concentrations of inhibitors. In this region of radiation dose, which depends, of course, on the level of inhibitor concentration, the amount of inhibitor varies linearly with the dose. It is obvious, of course, that the minimum operable dose must produce a free radical concentration which exceeds the inhibitor concentration.

An optimum balance of these factors is obtained when the free radical concentration produced in each irradiation cycle is between about $1 \times 10^{-8}$ and $4 \times 10^{-5}$, and preferably, between about $6 \times 10^{-8}$ and $2 \times 10^{-5}$ moles per cubic centimeter of substrate. This free radical concentration is obtained approximately by exposing the polymer to a radiation dose (in mrad.) of from about $0.01/G$ to $40/G$, and preferably $0.01/G$ to $20/G$, where G is the yield of free radicals per 100 electron volts (ev.) of energy absorbed in the polymer substrate, assuming substantially unit density. G is determined by the following approximate relation:

$$D = \frac{R}{G} \times 10^6$$

where D is dose in mrad., G is defined as above, and R is the free radical concentration in moles per cubic centimeter of substrate.

The use of G values to describe the yield of reactions produced by ionizing radiation is discussed in detail by many authors, for example, see Bacq and Alexander, "Fundamentals of Radiobiology" (Academic Press, New York City, 1955), pp. 36, 37; 86–91.

Suitable G values for various polymers may be found in the literature. For example, Harwood, Hausner, Morse and Rauch in "Effects of Radiation on Materials" (Reinhold Publishing Corporation, New York City, 1958), p. 290, give G (free radicals) as about 0.5 for polystyrene, and 5 for polymethyl methacrylate.

The G value of polyhexamethylene adipamide is determined by soaking the polymer as finely divided powder in a boiling, saturated solution of iodine in chloroform, evaporating the chloroform, and irradiating with 2 mev. electrone at $-78°$ C. The irradiated polymer is stored under nitrogen for 4 hours at $25°$ C., is then dissolved in m-cresol as a 0.4% solution. The decrease in iodine concentration (as compared to the original solution) is determined from the optical density at a wave length of 490 millimicrons. Irradiation at doses of 5 to 30 mrad. give an average free radical concentration of $3.0 \times 10^{-6}$ moles/gm.-mrad. The calculated G-yield is 5.8 for this polymer.

When the G value for a particular polymer is not available, and its determination appears to be inexpedient, a fairly satisfactory estimate can be made, since most aliphatic polymers have G values of 2 to 10, and in the extreme, G is seldom less than 0.1, even for wholly aromatic, radiation resistant polymers.

It should be noted that when grafting large amounts of monomers which have (as polymers) a high G value, the grafted substrate may show a G value higher than that typical of unmodified substrate. Under these conditions, it may be desirable to decrease the dose per pass correspondingly.

The total radiation dose required will depend on the weight of graft desired, and is readily determined when the weight gain per cycle and the dose per cycle has been established. In general, it is desirable to avoid a total accumulated dose which causes substantial degradation of the substrate polymer. This will depend on the polymer being treated. For example, polyamides, polyesters, and polyacrylonitrile normally should not be exposed to more than about 50 mrad., whereas the exposure of cellulosics, polyvinyl halides, and polyoxymethylene should be restricted to not over about 20 mrad.

AIR CONTACT TIME

When the soaked substrate has been exposed to the monomer fluid, and excess has been removed, it is preferred to keep its time of exposure to air to a minimum (especially after free-radical excitation) until it is again immersed in monomer. Blanketing with inert gas decreases the loss of free radicals by oxidation. It is often unnecessary to use an inert gas blanket since the reaction with monomer is so strongly preferred over reaction with air. However, the inert gas blanket will increase efficiency. In either case, the recontact of substrate and monomer is preferably made substantially immediately after irradiation. For instance, in a process similar to that of Example 1, in which N-vinyl-pyrrolidone is grafted to 66 nylon flake, the weight gain is 11.5% when the irradiated flake is immersed in the monomer 2 seconds after irradiation, as compared with a weight gain of 8.8% for a time interval of two minutes. Therefore, at room temperature and operating in air, holdup should be no longer than about 30 seconds while holdup times less than about 10 seconds are preferred. This will vary considerably depending on the temperature and the nature of the polymer substrate. Irradiation in air at 0° C. permits much longer storage of substrate at that temperature without substantial loss of free radical activity upon recontact with monomer fluid. The process is operable provided free radical decay does not cause the free radical concentration to fall below $1 \times 10^{-8}$ moles per cubic centimeter of substrate, before contact with the monomer; is indicated previously, the higher free-radical concentrations (defined herein) are preferred.

CONTACT WITH MONOMER FLUID

The conditions in this step of the process are adjusted to enhance penetration of the substrate polymer for two purposes: (a) to provide monomer to react with the existing free radicals, and (b) to saturate the substrate with monomer, ready to be grafted during the next irradiation. As will be apparent from Example 7 and FIG. IV, the most efficient length of contact period will vary with the temperature of the system. The temperature affects the grafting rate and the physical penetration rate. For any particular combination, curves similar to FIG. IV (which in effect relates contact time to absolute, i.e., graft and nongraft, weight gain) can be prepared for various temperatures. It is often more convenient to plot weight gain against (time) $^{1/4}$, since a nearly linear relation is obtained. This permits smoothing the data, and easier extrapolation to obtain the optimum initial rate. Generally, the grafted product is left in contact with monomer fluid until the grafting rate (i.e., percent weight gain per unit time) has dropped to less than ¼ and preferably to less than $\frac{1}{10}$ of its initial value. The temperature is adjusted so that the time required for the reaction, as determined above, is a minimum. Different temperatures during initial contact and recontact of substrate and monomer may be used to increase free radical life or the like. When treating polyhexamethylene adipamide substrates, soaking temperatures are usually from 25° to 100° C., with 40° to 70° C. preferred. These temperatures will usually permit satisfactory completion of the post-irradiation grafting step in from 1 to 120 minutes per cycle, and preferably from 1 to 50 minutes per cycle. For relatively rigid polymer or highly crystalline substrates, higher soaking temperatures are preferred in order to compensate for the slow diffusion rate.

To achieve the full advantages of the present invention, sufficient monomer contact to allow both a high amount of grafting and nongrafted penetration must be provided; monomer diffusion for both these purposes occurs simultaneously. Nongrafted penetration is not desired in a simple "irradiatiton followed by monomer contact" process, but in the repetitive process of the present invention it is important.

Contact of the monomer or monomer solution with air should be minimized for most efficient grafting. Best results are obtained when the solution is deaerated; it is preferred to blanket the solution with inert gas. In some cases, pH adjustment will improve the grafted color or processability of the product.

UTILITY

Process of this invention is highly effective in increasing the amount of grafting obtained per unit dose of radiation. In addition, the process provides a minimum loss of the modifier to homopolymer. Moreover, exposure of the monomer solution to ionizing radiation often results in the formation of colored products which affect the color of the graft copolymer product, rendering it less acceptable to the customer. This difficulty is avoided by the process of the present invention, for the monomer treating solution is exposed to minimum doses of radiation. The process of this invention is especially effective in producing bulk modification in which the graft extends more uniformly through the bulk of the solid polymer substrate, and is less concentrated at the surface than when produced by prior art processes. In addition, graft copolymer produced by the process of this invention is substantially more uniform in physical properties than those polymers produced by prior art processes.

Although the process of the present invention may be used for the wide range of polymer-monomer systems previously shown, the great advantage is seen when the solubility of the monomer in the polymer is less than about 10%. Higher solubility systems generally provide suitable results by prior art techniques. However, it has been found that lower solubility systems (i.e., less than about 10%) require the particular process of the present invention to economically achieve the objects heretofore discussed (e.g., a large amount of grafting, a uniform graft) which the prior art does not provide.

Many equivalent modifications of the above will be apparent to those skilled in the art from a reading of the above without a departure from the inventive concepts.

What is claimed is:

1. In the process for producing a graft copolymer between a monomer having ethylenic unsaturation, polymerizable by free radical mechanism, and a shaped substrate of a solid polymer penetrated by the monomer, selected from the class consisting of a synthetic linear condensation polymer, a vinyl addition polymer, and natural carbonaceous cellulose and protein polymers, wherein the shaped substrate is irradiated to initiate the graft copolymerization and the solubility of the monomer in the shaped polymer substrate is less than about 10% by weight, the improvement for graft copolymerizing large amounts of monomer substantially uniformly throughout the substrate which comprises the steps of (1) irradiating said polymer substrate with ionizing radiatiton of at least 50,000 electron-volts to a free radical concentration above $1 \times 10^{-8}$ and less than about $4 \times 10^{-5}$ moles per cubic centimeter of polymer and, prior to the decay of said free radical concentration to less than $1 \times 10^{-8}$ moles per cubic centimeter of polymer, (2) contacting said unsaturated monomer with the irradiated substrate to penetrate the said irradiated substrate to form graft copolymer and to saturate the said irradiated subtsrate with a fresh supply of nongrafted monomer, (3) removing unreacted monomer from the surface of the saturated polymer substrate, and thereafter repeating steps (1), (2), and (3), in order recited, thereby grafting in each repetition an amount of monomer greater than the solubility of monomer in the polymer substrate.

2. A process as defined in claim 1 wherein said polymer substrate is irradiated with ionizing radiation of at least 100,000 electron-volts.

3. A process as defined in claim 1 wherein said polymer substrate is irradiated to a free radical concentration within the range of $6 \times 10^{-8}$ to $2 \times 10^{-5}$ moles per cubic centimeter of polymer in each of said cycles.

4. A process as defined in claim 1 wherein said unsaturated monomer is contacted with said irradiated polymer substrate at a temperature of about 25° to about 100° C. for a period of about 1 to 120 minutes in each of said cycles.

5. A process as defined in claim 1 wherein exposure of said irradiated polymer substrate to air at room temperature and above is limited to less than 30 seconds in each of said cycles.

6. A process as defined in claim 1 wherein said unsaturated monomer is a vinyl compound of up to 5 carbon atoms.

7. A process as defined in claim 1 wherein said polymer substrate is polyhexamethylene adipamide.

8. A process as defined in claim 7 wherein said polymer substrate is irradiated at 0.002 to 3.5 mrad. per cycle for a total accumulated dose of less than 50 mrad.

9. A process as defined in claim 1 wherein said polymer substrate is polyethylene terephthalate.

10. A process as defined in claim 1 wherein said polymer substrate is polyethylene.

11. A process as defined in claim 1 wherein said substrate is in filament form.

12. A process as defined in claim 1 wherein said substrate is in film form.

13. The process of claim 1 wherein after steps (1), (2) and (3) and the repetition thereof, the process is terminated after step (3) by irradiating the saturated polymer substrate with a radiation dosage sufficient to cause grafting without substantial degradation of the polymer substrate.

14. The process of claim 1 wherein after steps (1), (2) and (3) and the repetition thereof, the process is terminated after step (2) by contacting said unsaturated monomer with the irradiated polymer substrate to penetrate the said irradiated polymer substrate to form graft copolymers and thereafter removing nongrafted monomer from the saturated polymer substrate.

References Cited

UNITED STATES PATENTS

| | | | |
|---|---|---|---|
| 2,999,056 | 9/1961 | Tanner | 204—159.17 |
| 3,298,942 | 1/1967 | Magat et al. | 204—159.17 |

SAMUEL H. BLECH, Primary Examiner

R. B. TURER, Assistant Examiner

U.S. Cl. X.R.

117—93.31; 204—159.12, 159.16, 159.17; 260—857, 858, 873, 874, 875, 877, 878